US012652532B2

(12) United States Patent

Koidis et al.

(10) Patent No.: US 12,652,532 B2

(45) Date of Patent: Jun. 9, 2026

(54) METHOD FOR AUTHENTICATING A WIRELESS REMOTE CONTROL AS A TEMPORARY PART OF A CONTROL DEVICE OF A ROCK MODIFICATION APPARATUS

(71) Applicant: Kleemann GmbH, Göppingen (DE)

(72) Inventors: Michael Koidis, Göppingen (DE); Lukas Bräuninger, Göppingen (DE)

(73) Assignee: Kleemann GmbH, Göppingen (DE)

( * ) Notice: Subject to any disclaimer, the term of this patent is extended or adjusted under 35 U.S.C. 154(b) by 52 days.

(21) Appl. No.: 18/920,864

(22) Filed: Oct. 19, 2024

(65) Prior Publication Data

US 2025/0150819 A1 May 8, 2025

(30) Foreign Application Priority Data

Nov. 6, 2023 (DE) ..................... 10 2023 130 685.5

(51) Int. Cl.
*H04W 12/06* (2021.01)

(52) U.S. Cl.
CPC .................................. *H04W 12/06* (2013.01)

(58) Field of Classification Search
CPC ........ H04W 12/06; B02C 25/00; G08C 17/02
See application file for complete search history.

(56) References Cited

U.S. PATENT DOCUMENTS

| | | |
|---|---|---|
| 2003/0020008 A1 | 1/2003 | Iwamoto et al. |
| 2010/0091103 A1 | 4/2010 | Peltonen et al. |

(Continued)

FOREIGN PATENT DOCUMENTS

| | | |
|---|---|---|
| DE | 202004006887 U1 | 7/2004 |
| DE | 102017103201 A1 | 8/2017 |

(Continued)

OTHER PUBLICATIONS

German Office Action for corresponding patent application No. 10 2023 130 685.5, dated Aug. 30, 2024, 8 pages (not prior art).

(Continued)

*Primary Examiner* — Nabil H Syed

(74) *Attorney, Agent, or Firm* — Jerry T. Sewell; Lucian Wayne Beavers; Patterson Intellectual Property Law, PC

(57) ABSTRACT

A method for the authentication of a wireless remote control as a temporary part of a control device of a rock modification apparatus prompts an apparatus data processing device to generate a human perceptible output of a first authentication information item on an apparatus data output device. An operator inputs the first authentication information item into the remote control. A wireless communication from the remote control to an apparatus-based part of the control device is set up by the remote control in response to the first item of authentication information. The apparatus data processing device generates a second item of authentication information and transmits second item of authentication information to the remote control via the wireless communication. A wireless communication between the remote control and the apparatus-based part of the control device is established on the basis of the second item of authentication information.

19 Claims, 4 Drawing Sheets

(56)　　　　References Cited

U.S. PATENT DOCUMENTS

| | | | | |
|---|---|---|---|---|
| 2010/0127824 A1* | 5/2010 | Moschl | ............. | G05B 19/4184 |
| | | | | 345/161 |
| 2014/0229033 A1* | 8/2014 | Cook | .................... | G05B 19/00 |
| | | | | 340/10.5 |
| 2016/0348504 A1* | 12/2016 | Hanski | .................... | E21B 7/022 |
| 2020/0361752 A1* | 11/2020 | Krebs | .................... | G08C 19/00 |
| 2023/0191424 A1 | 6/2023 | Bockle et al. | | |
| 2024/0024889 A1 | 1/2024 | Böckle et al. | | |

FOREIGN PATENT DOCUMENTS

| | | | |
|---|---|---|---|
| DE | 102021134145 A1 | 6/2023 | |
| DE | 102022118032 B3 | 8/2023 | |
| EP | 3105646 A1 | 12/2016 | |
| KR | 1020120014520 A | 2/2012 | |

OTHER PUBLICATIONS

European Patent Office Search Report for corresponding patent application No. 24210584.9 dated Mar. 18, 2025, 7 pages (not prior art).

* cited by examiner

S30 ⌐                                                    A3

S32 ⌐

Reading in the second item of authentication information using a further remote data intake device

S34 ⌐

Establishing a wireless communication between the further remote control and the apparatus-based part of the control device on the basis of the second item of authentication information

METHOD FOR AUTHENTICATING A WIRELESS REMOTE CONTROL AS A TEMPORARY PART OF A CONTROL DEVICE OF A ROCK MODIFICATION APPARATUS

RELATED APPLICATION

This application claims the benefit of German Patent Application No. DE 10 2023 130 685.5 filed on Nov. 6, 2023, which is hereby incorporated herein by reference.

FIELD OF THE DISCLOSURE

This disclosure relates to a method for authenticating a wireless remote control as a temporary part of a control device of a rock modification apparatus. A rock modification apparatus within the meaning of the present application is an apparatus that modifies at least one state parameter of rock. In a simple preferred case, the apparatus may be a rock conveyor apparatus, which conveys rock from a first location to a second location and thus modifies the spatial coordinates of the rock. The apparatus may likewise be a rock processing apparatus, which sorts rock, for example by screening, and/or which modifies rock structurally, for example by crushing.

BACKGROUND

A remote control within the meaning of the present application is preferably designed for inputting control commands. Alternatively, or preferably, a remote control within the meaning of the present application may be additionally designed for outputting, in particular for visually outputting, operating data. The remote control within the meaning of the present application may hence also be designed solely for outputting operating data.

A method for authenticating a wireless remote control as a temporary part of a control device of a rock modification apparatus is known from the "SPECTIVE" control system of the applicant. The "SPECTIVE" control system of the applicant offers as an extension under the name "SPECTIVE CONNECT" the option of authenticating a wireless remote control, for example, by using a smart phone, via a corresponding app as a temporary part of the control device of the rock modification apparatus and to use it following the authentication.

In the known SPECTIVE system, an apparatus-based part of the control device of the rock modification apparatus outputs a QR code on a display, which is read using a camera of a smart phone or of another portable mobile device. An identifier of the network available from the apparatus-based part of the control device and an alphanumeric password are transmitted with the QR code as authentication information. The remote control (e.g., a smart phone or a tablet computer in the present case) that reads in the QR code uses the network identifier and the alphanumeric password transmitted to it for setting up a connection to the apparatus-based part of the control device. Without knowledge of the network identifier and of the password, communication between the remote control and the apparatus-based part of the control device cannot be established. Without this communication, the remote control cannot be used as part of the control device of the rock modification apparatus.

A disadvantage of this generally very practical solution is the requirement of a high-quality monitor on the side of the apparatus-based part of the control device, so that a QR code can be output there in legible fashion.

Moreover, rock modification apparatuses, which normally comprise as apparatus components a material feed device for loading rock material to be processed, at least one conveyor device for conveying material between two locations and/or for discharging rock material, and a control device for controlling apparatus components of the rock modification apparatus, operate in an environment of dirt and dust, which may compromise the output quality of the monitor displaying the QR code to such an extent that the QR code displayed on it can no longer be readily read in without errors by the remote control.

An example of a rock modification apparatus according to the present disclosure is a rock modification apparatus that additionally comprises at least one working device of a crushing device and a screening device. The at least one conveyor device may then be designed for conveying rock material from the material feed device to the at least one working device, from the at least one working device to a stockpile discharge, and possibly for the further conveyance of rock material within the rock processing apparatus. A rock processing apparatus preferably has more than one conveyor device.

DE 20 2004 006 887 U1 discloses a processing plant for mineral materials, which comprises sensors and actuators that are connected to one another in data-transmitting fashion via a field bus. The field bus has a transmitter-receiver connection, by way of which a user interface may be connected wirelessly to the field bus for transmitting data between the user interface and the field bus. The user interface is able to output information about the operating state of individual machines of the processing plant via a display screen. By operating appropriate switches and pushbuttons of the user interface, an operator is able to control the actuators of the processing plant. The wireless communication of the known plant may be implemented via signal standards of one or more of Bluetooth®, WLAN, GPRS, EDGE and UMTS.

DE 20 2004 006 887 U1 does not disclose details about the connection of the wireless user interface to the field bus of the machines of the processing plant. Since this publication, however, emphasizes a preferred use of the Bluetooth® standard, it is to be assumed that the connection occurs according to the generally known procedures of the Bluetooth® standard. These are usually a search for Bluetooth® devices in the surroundings of a Bluetooth® device that are ready for pairing, possibly an output of a four-digit numerical code via a Bluetooth® device and its manual input in a respective other Bluetooth® device, and a positive acceptance of the pairing request regarding the connection of the two Bluetooth® devices.

EP 3105646 B1 describes a method for initiating a remote control process of a vehicle for rock mining. This method uses a security key as an authentication means, by which the remote control process can be initiated in the vehicle. In response to a start of the remote control process in the vehicle, the vehicle transmits a message to the remote control, whereupon the vehicle is confirmed as having been admitted into the security system of the remote control. Subsequently, the remote control is configured in order to start a remote control mode of the vehicle.

The security key known from EP 3105646 B1 is preferably a physical key, but may alternatively also be an electronic data-based key. Multiple vehicles or working machines may be admitted into the security system of the remote control so that one remote control is able to control more than one vehicle or more than one working machine.

U.S. Pat. No. 10,663,955 B2 discloses the setup of a wireless communication between multiple working machines of a waste management system. The communication between the working machines is task-based and includes an identifier of the relevant activity.

SUMMARY

Starting in particular from the SPECTIVE system described above, it is the object of the present disclosure to provide a technical teaching that makes it possible to achieve a sufficiently secure authentication of the remote control as part of a control device of a rock modification apparatus even in the case of a reduced possibility for outputting authentication information. On the basis of a sufficiently secure authentication, a wireless communication can be put into operation, via which control commands are transmitted from the remote control to the rock modification apparatus and are executed by the latter. Alternatively, or additionally, operating data may be transmitted to the remote control via the wireless communication to be output by the remote control. Thus, a sufficiently secure connection may be achieved between the remote control and the rock modification apparatus even when the rock modification apparatus is able to output information only to a limited extent, be it because an existing output device is not designed for outputting more complex information, such as a QR code for example, or because the output device has lost its original suitability for outputting more complex information due to continuous operation in abrasive surroundings.

According to one method aspect of the present disclosure, this object is achieved by a method having the features of the apparatus and method disclosed and claimed herein.

The rock modification apparatus, which is involved in the execution of the method, comprises an apparatus-based part of the control device. The term "apparatus-based" refers to the rock modification apparatus, which is also referred to below simply as "apparatus." Likewise, placing the expression "apparatus" in front of a noun in the present application indicates an affiliation with the rock modification apparatus.

The apparatus-based part of the control device is preferably an on-board control device, which is permanently connected indirectly or directly to a machine frame of the rock modification apparatus such as is the case for example on an operating console for a machine operator of the rock modification apparatus. Quite generally, the apparatus-based part of the control device may be any control device that for the purpose of controlling the operation of the rock modification apparatus is already connected to the latter in such a way that control signals may be transmitted from the apparatus-based part of the control device to at least one device, such as for example a data output device, in particular a display device, and/or to at least one actuator and possibly to at least one sensor of the apparatus and in the event of a transmission may cause an action in the destination device. Particularly preferably, the apparatus-based part of the control device is also connected for receiving signals from at least one actuator and/or at least one sensor of the rock modification apparatus such that the apparatus-based part of the control device is able to output signals from at least one actuator and/or at least one sensor and/or is able to take these into account when generating future control signals.

At least the apparatus-based part of the control device comprises an apparatus data processing device connected to the rock modification apparatus, an apparatus data output device connected in data-transmitting fashion to the apparatus data processing device, and an apparatus transmitting and receiving device connected in data-transmitting fashion to the apparatus data processing device for the wireless transmission of data. The apparatus data processing device comprises preferably one or multiple integrated circuits and at least one data memory in which an operating program of the apparatus data processing device may be stored so as to be executable by the apparatus data processing device and in which data may be stored so as to be retrievable by the apparatus data processing device.

The apparatus data output device is designed for the humanly perceptible output of data. This makes it possible for an operator to perceive a data output. This helps to limit the range within which output data are perceptible, for example in contrast to nondirectionally emitted radio waves. Furthermore, humanly perceptible data can be intercepted or reconnoitered by unauthorized third parties only with difficulty, since the data preferably output in only humanly perceptible fashion require an approach to the apparatus data output device, which is not achievable or is achievable only with difficulty for unauthorized persons, in order to be able to perceive the data, and since the data preferably output only in humanly perceptible fashion can be completely captured by machines only under hampered conditions.

The apparatus transmitting and receiving unit is used for wireless communication with other transmitting and receiving devices such as, for example, the remote control described in more detail below. The wireless communication may occur on the basis of various standards such as, for example, WLAN, a mobile telephony standard, NFC, RFID or Bluetooth®.

Of course, the apparatus-based part of the control device may also include an apparatus data input device for inputting data into the control device. This advantageous further development, however, is not directly relevant to the basic idea of the apparatus and method disclosed herein.

Just as the preceding expression "apparatus" indicates a reference to or an affiliation with the rock modification apparatuses, the preceding expression "remote" indicates a reference to or an affiliation with the remote control. The wireless remote control involved in the implementation of the method discussed below comprises a remote data processing device, a remote data input device connected in data-transmitting fashion to the remote data processing device for inputting data by an operator, and a remote transmitting and receiving device connected in data-transmitting fashion to the remote data processing device for the wireless transmission of data. The remote data processing device preferably also comprises at least one integrated circuit and a data memory. What was said above about the apparatus data processing device applies mutatis mutandis to the data memory of the remote data processing device and its properties and contents.

The method initially comprises the following step:

i. Prompting the apparatus data processing device to generate a first item of authentication information with a lower security level. The first item of authentication information has a lower security level than the second item of authentication information discussed further below.

According to the basic idea of the present disclosure, the security level of an item of authentication information is determined by the number of possible combinations of elements forming the item of authentication information. This number of combinations corresponds to a number of attempts that are maximally required in order to overcome an authentication requirement without authorization, but successfully, by a brute force attack, in which every possible combination of elements is tried.

The first item of authentication information is preferably formed by a smaller character set and/or by a smaller number of characters from the character set than the second item of authentication information discussed further below. The first item of authentication information is thus less secure than the second item of authentication information, but is also required only over a shorter, in particular over a markedly shorter, period of time compared to the more secure second item of authentication information.

It is therefore possible to output the first item of authentication information securely in humanly perceptible fashion even via very simple or greatly hampered apparatus data output devices.

The first item of authentication information is preferably composed only of numerals so that its character set comprises maximally ten different elements. Additionally, or alternatively, the first item of authentication information may comprise 8 digits to 40 digits, preferably 10 digits to 28 digits, and particularly preferably 24 digits.

Once the first item of authentication information has been generated, the next method step may be performed:

ii. Humanly perceptible output of the first item of authentication information on the apparatus data output device.

As used herein, "humanly perceptible" means perceptible via at least one human sense. For example, the first item of authentication information may be output acoustically, which is less preferred because acoustic outputs are in a certain way nondirectional and may possibly be perceived in places in which their perception is not desired. This risk may be reduced by an appropriate selection of the volume of the output. It may be taken into account, however, that the apparatus and the remote control are normally located on construction sites, where there is a noise level that prevents a great reduction of the volume level of the output of the first item of authentication information.

Preferably, the first item of authentication information is displayed visually on a screen or monitor. The operating environment of the apparatus does not prevent a secure visual perception even of characters of a small size, as were used on displays of earlier mobile telephones. Such displays can be perceived very well, if one gets sufficiently close to the apparatus data output device but are already no longer discernible for a human being without implements from a slightly greater distance, that is, for example from a distance of more than 2 meters from the apparatus data output device. For outputting a first item of authentication information composed only of numerals or a similarly limited character set, a very simple monochrome monitor suffices, which advantageously increases the robustness of the apparatus data output device and advantageously reduces its manufacturing costs. Moreover, visual outputs, in contrast with acoustic outputs, may be output only in defined directions or directional areas.

Once the first item of authentication information has been output in a humanly perceptible fashion, the operator perceiving the first item of authentication information is able to acknowledge the complete and correct perception by a signal input. For example, the operator can operate a switching device such as a switching surface or control knob. The following method step may be performed in response to the acknowledgement:

iii. Input of the first item of authentication information into the remote data input device by the operator.

The use of an operator as a middleman of the information transmission is in the present case a security feature that impedes the first item of authentication information from being read off by a spying machine.

Following the input of the first item of authentication information into the remote data input device, the remote control and the apparatus-based part of the control device possess matching, sufficiently secret information, so that the remote control is able to authenticate itself vis-a-vis the apparatus-based part of the control device as a device with an elevated trust level. To this end, the following method step may be performed:

iv. Setup of a wireless communication with the apparatus-based part of the control device by the remote control on the basis of the first item of authentication information.

The remote control and the apparatus-based part of the control device are able to start wireless communication via their respective transmitting and receiving devices. During the course of the wireless communication, the apparatus-based part of the control device checks the first item of authentication information transmitted by the remote transmitting and receiving device to the apparatus-based part of the control device for accuracy and completeness. If the check was successful, the apparatus-based part of the control device continues to operate the established wireless communication. In the event of an unsuccessful check, the initiated wireless communication is terminated immediately, in conjunction with an output of an error message if desired.

Upon the successful setup of the communication with the apparatus-based part of the control device, the remote control is considered to be authenticated on the rock modification apparatus on the basis of the first item of authentication information.

Such a check also comprises a use of the first item of authentication information as a cryptographic key for encrypting information, which the remote control transmits to the apparatus-based part and which the latter is able to decrypt using a further key, as is known from the technique of asynchronous encryptions. It is also a check in the sense of the present disclosure if the first item of authentication information is used as the basis of a modulation of the transmission signal emitted by the remote control to the apparatus-based part of the control device and the apparatus transmitting and receiving device is exclusively ready to receive a correspondingly modulated transmission signal.

In order to increase the communication security, the following method step is performed following the establishment of the wireless communication between the remote control and the apparatus-based part of the control device:

V. Generation of a second item of authentication information with a higher security level by the apparatus data processing device.

According to the explanations provided above, the second item of authentication information comprises at least one larger character set and/or a greater number of characters than the first item of authentication information. Let m be the number of selectable elements in a set of elements and n be the number of elements actually used for forming an item of authentication information. There are then $m^n$ possibilities of forming the item of authentication information from the set of m elements. For n>>m, the incrementation of m by 1 increases the number of possible combinations by more than the incrementation of n by 1. For m>>n, the incrementation of n by 1 increases the number of possible combinations by more than the incrementation of m by 1.

Since on the basis of using the first item of authentication information the remote control is a temporarily trustworthy device for the apparatus-based part of the control device, the apparatus-based part of the control device is able to transmit the second item of authentication information to the remote control via the established wireless communication in accordance with the following step:

vi. Wireless transmission of the second item of authentication information to the remote control.

With the second item of authentication information, the remote control now has stronger authentication information, which is much harder for third parties to guess or to "hack" than the first item of authentication information. The second item of authentication information may be used by the remote control in different ways.

Thus, after performing the step vi, the method for increasing the communication security may comprise the following further steps:

vii. Establishing a wireless communication between the remote control and the apparatus-based part of the control device on the basis of the second item of authentication information, viii. Deactivating the first item of authentication information.

The sequence of the performance of the steps vii and viii is not specified by the roman numeral of the steps. The first item of authentication information may be deactivated prior to the second item of authentication information.

The deactivation of the first item of authentication information means that no wireless communication can be established or maintained between a remote control or any other device or apparatus and the apparatus-based part of the control device on the basis of the first item of authentication information. To do so following the deactivation of the first item of authentication information would require a new performance of the step i.

On the basis of the second item of authentication information, a wireless communication can be established anew between the remote control and the apparatus-based part of the control device.

Upon the successful establishment of the communication with the apparatus-based part of the control device, the remote control is considered to be authenticated on the rock modification apparatus on the basis of the second item of authentication information.

In general, a generation of a first item of authentication information according to the step i above may be prompted by operating a corresponding switching device such as a switching surface and/or a switch and/or a pushbutton on the apparatus-based part of the control device. To this end, it is necessary that an operator has access to the apparatus-based part of the control device and knows what operation or operations prompt a generation of a first item of authentication information. Alternatively, or additionally, the prompting of a generation of the first item of authentication information may comprise checking a compatibility of an authentication secret on the side of the operator with an authentication secret on the side of the apparatus.

For example, an authentication secret on the side of the operator may be a key or an electronic data memory and the authentication secret on the side of the apparatus may be a lock cylinder with tumblers corresponding to the key or a reader unit and a data memory unit on the side of the apparatus.

In the combination of key and lock cylinder, the compatibility check is a check of a mobility of the cylinder core in the cylinder housing so that a switch indicating a successful compatibility check can be operated by rotating the cylinder core in the cylinder housing.

In a combination of data memory and reader unit/check routine, the compatibility check may comprise or be a comparison of read data and data stored in the data memory on the side of the apparatus and/or a computation operation on the basis of read data and data stored on the side of the apparatus.

Although the step v may occur automatically following the setup of the wireless communication on the basis of the first item of authentication information, it is more advantageous for the security of the communication if the method comprises between the step iv and the step v a step of transmitting a request signal from the remote control to the apparatus-based part of the control device. A second item of authentication information with a higher security level is generated by the apparatus data processing device in the step v only upon receipt of the request signal in the apparatus data processing device. This makes it possible to ensure that the second item of authentication information is generated only when the remote control and/or the operator is or are ready for it. The request signal may be generated by the remote control automatically or by the operator by accordingly operating at least one operating means such as for example a switching surface and/or control knob and/or pushbutton. The transmission of the generated request signal may also occur automatically by the remote control or by the operator accordingly operating at least one operating means.

The apparatus data processing device may be designed to delete the first item of authentication information after the expiration of a predetermined period of time following the prompting of its generation or following its humanly perceptible output. The predetermined period of time preferably is no longer than 5 minutes, which readily suffices to enter an 8-digit to 40-digit numerical character string into the remote control. Merely by way of example, the following demonstration shows that a 12-digit character string formed from the numerals 0 to 9 as the first item of authentication information forms 1012 combinatorial possibilities of forming the first item of authentication information. Assuming that a mobile computer available in proximity to the location of use of a rock modification apparatus is able to try 200 million character strings per second, it would require 5,000 seconds (e.g., about 1 hour and 23 minutes) in order to test all available combinations. In no more than 5 minutes, a brute force attack is only able to test less than one per thousand of the possible combinations. The probability of success of such an attack is accordingly low.

It is often desirable to connect not only one, but multiple wireless remote controls to a rock modification apparatus as a temporary part of its control device. An advantageous approach from the perspective of system security is not to perform the method described above starting from the step i for connecting a further wireless remote control to the rock modification apparatus and once more to use a less secure first item of authentication information. Instead, it is preferred that the remote control comprises a remote data output device connected in data-transmitting fashion to the remote data processing device for outputting data, the method comprising the following further steps:

a. Outputting the second item of authentication information using the remote data output device of the remote control, b. Reading in the second item of authentication information using a further remote data intake device of a further wireless remote control, wherein the further wireless remote control comprises a further remote data processing device, the further remote data intake device connected in data-transmitting fashion to the further data processing device for taking in data, and a further remote transmitting and receiving device connected in data-transmitting fashion to the further remote data processing device for the wireless transmission of data, and c. Establishing a wireless communication between the further remote control and the apparatus-based part of the control device on the basis of the second item of authentication information.

The remote control and the further remote control may be any remote controls. In particular, at least one remote control of the remote control and the further remote control may be a smart phone or a tablet computer. As preferred remote data output devices, smart phones and tablets have high-quality monitors with a high resolution and clear image rendering. Furthermore, as remote data intake devices, these devices have high-quality cameras likewise with sufficiently high resolution in order to read in a second item of authentication information output by the monitor of a remote control. The remote data intake device may be part of the remote data input device or may be the remote data input device.

Again, the visual output of the second item of authentication information and the optical reading in of the same is a preferred method for the reasons mentioned above. In principle, it is also possible, however, to output and "read in" the second item of authentication information acoustically. A transmission through electromagnetic waves, for example according to the NFC standard, the RFID standard, or the Bluetooth® standard, is also conceivable for outputting and reading in.

To avoid unwanted eavesdropping or reconnoitering of the second item of authentication information, a further development of the present disclosure may provide for the remote data output device of the remote control to output the second item authentication information only into a limited spatial area so that it can only be read in by the remote data intake device if the latter is located in the limited spatial area. This is the case, for example, if the remote data output device displays the second item of authentication information on a monitor. The monitor has a display side and a back side and it is possible to see information only on the display side. Relative to a normal vector onto the display surface of the monitor, it is usually possible to read the monitor only within a visual cone that has the normal vector as its cone axis, which visual cone is determined by the construction type of the monitor. Additionally, or alternatively, the remote data processing device may select a display size on the monitor that yields machine-readable results only up to a certain distance, for example, up to a distance of 1 meter or 2 meters. The remote data output device preferably outputs the second authentication information in encoded fashion, for example as a QR code. The use of a QR code allows not only for a compressed display of the second item of authentication information, but also makes it possible to reduce the range of the displayed second item of authentication information further since already from a distance of half a meter or 1 meter details of QR codes on monitors such as those of smart phones or tablets are discernible only with great difficulty.

The second item of authentication information is preferably stored on the remote control in a remote data memory.

The second item of authentication information preferably remains active until it is revoked or, if desired, until a predetermined or specifiable period of time has elapsed, so that following the termination of its communication connection with the apparatus-based part of the control device, a remote control already authenticated by the second item of authentication information is able to authenticate itself anew directly with the second item of authentication information on the apparatus-based part of the control device. A termination of the communication connection may be brought about for example by switching off the remote control, by switching off the apparatus-based part of the control device, or by moving the remote control out of the transmission range of the remote transmitting and receiving device and the apparatus transmitting and receiving device.

Apart from the connection of two remote controls to one rock modification apparatus, the connection of one remote control to two or more rock modification apparatuses is also of interest. Often, two or more rock modification apparatuses are interlinked at their location of use, for example in that one rock modification apparatus takes over as the material it is to modify material modified by another rock modification apparatus. For the following description, the rock modification apparatus described above is referred to as the "first rock modification apparatus."

If the further rock modification apparatus has a sufficiently powerful monitor, the connection of the remote control to the further rock modification apparatus may be established in the usual manner by outputting an item of authentication information on the monitor, for example as a QR code, and by the automated reading in of the authentication information using a corresponding reading device of the remote control, such as for example the remote data intake device, on the basis of the thus exchanged authentication information.

If such a monitor is not available or if the exchange of authentication information described in the preceding paragraph is not to be performed for some reason, it is possible, for the purpose of connecting one remote control to more than one rock modification apparatus, for example for connecting a remote control authenticated on the aforementioned first rock modification device on the basis at least of the first item of authentication information, i.e., on the basis of the first or the second item of authentication information, and a further rock modification apparatus, to perform the steps i to vi for authenticating the remote control as a temporary part of a further control device of the further rock modification apparatus. The remote control is preferably able to communicate wirelessly with the first rock modification apparatus already on the basis of the second item of authentication information or already communicates with it.

According to a technical alternative of the present disclosure, a remote control may be designed so as to be able to be in a wireless communication connection only with one rock modification apparatus or its apparatus-based control device at a time. In this case, following the authentication on the apparatus-based control device of the first rock modification apparatus at least by way of the first item of authentication information, preferably however by way of the second item of authentication information, the remote control is able to terminate the wireless communication set up or established with the apparatus-based part of the control device, in order to set up and establish a further wireless communication with the further rock modification apparatus.

If the remote control is designed for establishing a simultaneous wireless communication connection with more than one rock modification apparatus or the respective apparatus-based control devices, a wireless communication may be set up or established with the further rock modification apparatus, while a wireless communication connection exists with the first rock modification apparatus. On the remote control, it is possible to switch between the connected rock modification apparatuses in order to select a wireless communication connection as the active wireless communication connection for a signal transmission, while the other wireless communication connections are set to stand-by or are running in the background.

Like the aforementioned first rock modification apparatus, the further rock modification apparatus comprises as the apparatus-based part of its further control device at least one further apparatus data processing device connected to the further rock modification apparatus, a further apparatus data output device connected in data-transmitting fashion to the further apparatus data processing device for the humanly perceptible output of data, and a further apparatus transmitting and receiving device connected in data-transmitting fashion to the further apparatus data processing device for the wireless transmission of data. What was said previously with regard to the rock modification apparatus and its construction also applies mutatis mutandis to the presently discussed further rock modification apparatus. In the steps i to vi, a setup of the apparatus-based part of the control device is replaced by the corresponding further setup of the apparatus-based part of the further control device. Thus, it is possible gradually to connect step-by-step the same remote control to two or more rock modification apparatuses and to set up a wireless communication between the remote control and each of the rock modification apparatuses. According to the explanations above, the multiple wireless communication connections may exist sequentially or simultaneously.

For the already explained reasons of increased communication security, it is advantageous if the remote control and the apparatus-based part of the further control device perform the steps vii and viii with the provision that the apparatus-based part of the control device is replaced by the apparatus-based part of the further control device. Thus, it is possible to establish, sequentially or simultaneously, a wireless communication between the remote control and each of the rock modification apparatuses, vis-a-vis which the remote control is authenticated. For this purpose, the first item of authentication information with its lower security is only required in an initial phase of a first communication setup.

If a remote control is authenticated vis-a-vis at least two rock modification apparatuses, then it is possible, according to an advantageous further development, to form a plant train in terms of control engineering from the at least two rock modification apparatuses communicating sequentially or simultaneously with the same remote control. The method therefore preferably comprises the step of forming a plant train from the apparatuses wherein the rock modification apparatus and the further rock modification apparatus communicate wirelessly, sequentially or simultaneously, with the remote control on the basis of the respective second items of authentication information.

The plant train may also be formed in that by sequentially or simultaneously connecting a remote control to the rock modification apparatuses selected for forming the plant train, the rock modification apparatuses are interconnected by the remote control for signal transmission and the remote control is directly connected for wireless communication only to one rock modification apparatus of the rock processing apparatuses connected to form a plant train. The plant train thus formed forms a kind of master-slave system, in which the rock modification apparatus connected directly to the remote control forms the master apparatus and the at least one rock modification apparatus connected indirectly to the remote control via the master apparatus forms a slave apparatus.

To prevent the wireless communication from being compromised, the method preferably comprises the step of severing the wireless communication existing between the remote control and the rock modification apparatus in response to a predetermined dissolution event. The dissolution event may be predefined accordingly, for example if the previously authenticated remote control or one of the previously authenticated remote controls loses the wireless communication contact with the rock modification apparatus or with one of the rock modification apparatuses.

Preferably, not only is the wireless communication between the remote control and the rock modification apparatus communicating wirelessly with the remote control to be terminated, but also the authentication on the basis of the second item of authentication information is to be deleted or deactivated when the generation of a first item of authentication information is prompted on the rock modification apparatus communicating with the remote control. In the case of a plant train, this applies preferably when the generation of a first item of authentication information is prompted on one of the rock modification apparatuses of the plant train. The prompting of a generation of a first item of authentication information is an indication that a new authentication of a remote control is to be performed on the apparatus-based part of the control device of the rock modification apparatus. On the basic assumption that such a request of a first item of authentication information does not occur without a reason, existing wireless communications between an apparatus-based part of a control device of an apparatus and the remote control are terminated.

With the termination of the communication preferably all active items of authentication information are deactivated on the at least one rock modification apparatus.

The aforementioned object is also achieved by a machine set of a rock modification apparatus and a wireless remote control, wherein the rock modification apparatus comprises as apparatus components a material feed device for loading rock material to be processed, at least one conveyor apparatus for conveying material between two different locations, and a control device for controlling at least one apparatus component of the rock modification apparatus; wherein the control device comprises as an apparatus-based part an apparatus data processing device connected to the rock modification apparatus, an apparatus data output device connected in data-transmitting fashion to the apparatus data processing device for the humanly perceptible output of data, and an apparatus transmitting and receiving device connected in data-transmitting fashion to the apparatus data processing device for the wireless transmission of data; wherein the wireless remote control comprises a remote data processing device, a remote data input device connected in data-transmitting fashion to the remote data processing device for inputting data by an operator, and a remote transmitting and receiving device connected in data-transmitting fashion to the remote data processing device for the wireless transmission of data; and wherein the rock modification apparatus and the wireless remote control are designed for the authentication of the remote control as a temporary part of the control device for carrying out the method as described and refined above.

The rock modification apparatus is preferably a rock conveyor apparatus or a rock processing apparatus additionally including at least one working device of a crushing device and a screening device as at least one further apparatus component.

Explanations provided above regarding the method are also explanations of the machine set that is designed for carrying out the method.

As already explained previously in connection with the method, the same remote control may be connected sequentially or simultaneously to more than one rock modification apparatus for wireless communication so that the remote control is then also part of the control device of the further rock modification apparatus. In this case of a preferred further development of the present disclosure, the machine set comprises a further rock modification apparatus; wherein the further rock modification apparatus comprises as apparatus components a further material feed device for loading rock material to be processed, at least one further conveyor device for conveying material between two different locations, and a further control device for controlling apparatus components of the further rock modification apparatus; wherein the further control device comprises as an apparatus-based part a further apparatus data processing device connected to the further rock modification apparatus, a further apparatus data output device connected in data-transmitting fashion to the further apparatus data processing device for the humanly perceptible output of data, and a further apparatus transmitting and receiving device connected in data-transmitting fashion to the further apparatus data processing device for the wireless transmission of data; and wherein, for the purpose of authenticating the remote control, which is already authenticated on the rock modification apparatus on the basis of at least the first item of authentication information, as a temporary part of the further control device, the wireless remote control and the further rock modification apparatus are designed to perform the steps i to vi with the provision that for this purpose a setup of the apparatus-based part of the control device in the steps i to vi is replaced with the corresponding further setup of the apparatus-based part of the further control device of the further rock modification apparatus.

The further rock modification apparatus may also comprise or be a rock conveyor apparatus or a rock processing apparatus additionally including at least one working device of a crushing device and a screening device as at least one further apparatus component.

The rock modification apparatus and the further rock modification apparatus may form, in accordance with the previous explanations, a plant train in terms of control engineering, preferably as cooperating rock modification apparatuses.

Likewise, in accordance with the detailed explanation already provided above, one rock modification apparatus is able to communicate wirelessly with more than one remote control, so that more than one remote control is a temporary part of the control device of the rock modification apparatus. In this preferred further development, the remote control comprises a remote data output device connected in data-transmitting fashion to the remote data processing device for outputting data; wherein the machine set comprises a further wireless remote control, wherein the further wireless remote control comprises a further remote data processing device, a remote data intake device connected in data-transmitting fashion to the further data processing device for taking in data, and a further remote transmitting and receiving device connected in data-transmitting fashion to the further remote data processing device for the wireless transmission of data; and wherein the rock modification apparatus, the remote control and the further remote control are designed to carry out the method, as it is described and further developed above.

Using the remote control, an operator is able to control, via the once established wireless communication, preferably at least one apparatus component of the rock modification apparatus, i.e., is able to activate and/or deactivate and/or change the operating state of the apparatus component.

The wireless communication established on the basis of the first item of authentication information between the apparatus and the remote control is preferably used only with the aim of establishing the wireless communication on the basis of the second item of authentication information. For this reason, it is preferred that the wireless communication established between the apparatus and the remote control on the basis of the first item of authentication information does not allow an operator to control an apparatus component with the exception of a possible prompting of the apparatus data processing device to generate a second item of authentication information and to transmit it to the remote control.

Numerous objects, features, and advantages of the embodiments set forth herein will be readily apparent to those skilled in the art upon reading of the following disclosure when taken in conjunction with the accompanying drawings.

BRIEF DESCRIPTION OF THE DRAWINGS

The embodiments disclosed herein are explained in greater detail below with reference to the enclosed drawings in which.

DETAILED DESCRIPTION

The figures are not true to scale but reflect relative dimensions correctly.

Figure 1:
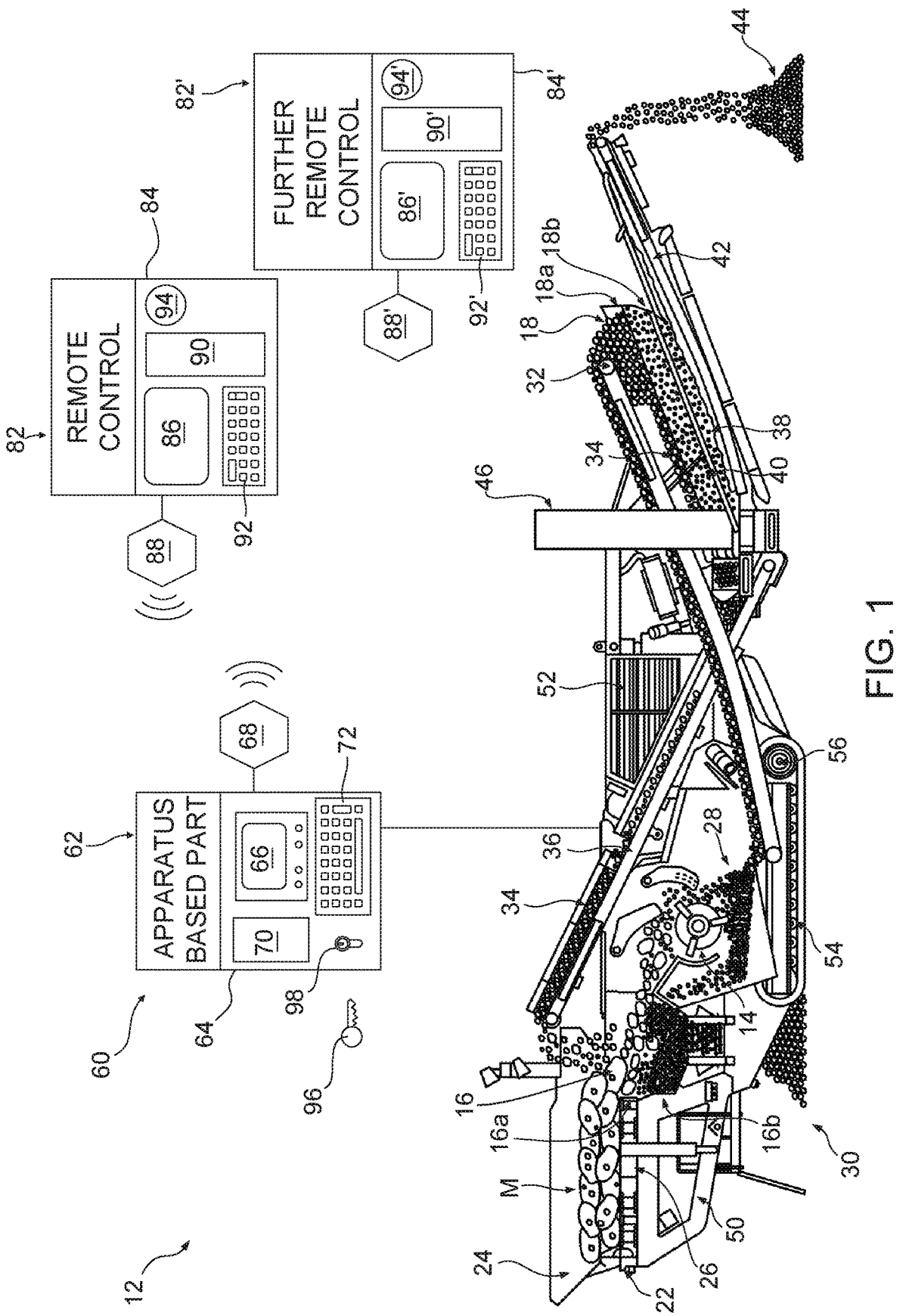
FIG. 1 illustrates a schematic representation of a machine set of a rock modification apparatus and a control system.

FIG. 1 shows a rock modification apparatus 12 as a rock processing apparatus including an impact crusher 14 as a crushing device and a pre-screen 16 as well as a post-screen 18 as screening devices. The location of use of the rock modification apparatus 12 is in the present case preferably a rock quarry but may also be a recycling yard or a demolition site of one or multiple buildings.

Material M to be processed by the rock modification apparatus 12 (e.g., to be sorted according to size and to be crushed) is fed discontinuously by being loaded by a backhoe (not shown) as a loading apparatus of the rock modification apparatus 12 into a material feed device 22 having a funnel-shaped material buffer 24.

From the material feed device 22, a vibrating conveyor in the form of a trough conveyor 26 conveys the material M to the pre-screen 16, which comprises two pre-screen decks 16a and 16b. Of the two decks, the upper pre-screen deck 16*a* has a greater mesh aperture and separates and feeds to the impact crusher 14 those grain sizes that require crushing according to the respective specifications for the final grain product to be obtained.

Grains falling through the upper pre-screen deck 16*a* are sorted further by the lower pre-screen deck 16*b* into a usable grain fraction 28, which corresponds to the specifications of the final grain product to be obtained, and an undersize grain fraction 30, which has a grain size that is so small that it is unusable as value grain.

The number of stockpiles or fractions shown in the exemplary embodiment is provided merely by way of example. The number may be greater or smaller than indicated in the example. Moreover, the undersize grain fraction 30 explained in the present example as waste could also be a value grain fraction if the grain size range accruing in the fraction 30 is usable for further applications.

The usable grain fraction 28 is increased by the crushed material output by the impact crusher 14 and is conveyed to the post-screen 18 by a further conveyor device 32 in the form of a belt conveyor. In the illustrated exemplary embodiment, the post-screen 18 also has two screen decks or post-screen decks 18*a* and 18*b*, of which the upper post-screen deck 18*a* has the greater mesh aperture. The upper post-screen deck 18*a* allows value grain to fall through its mesh and sorts out an oversize grain fraction 34 having a grain size that is greater than the greatest desired grain size of the value grain. The oversize grain fraction 34 is returned by an oversize grain conveyor device 36 into the material input of the impact crusher 14 or into the pre-screen 16. In the illustrated exemplary embodiment, the oversize grain conveyor device 36 takes the form of a belt conveyor.

The useful grain of the useful grain fraction 28 thus comprises oversize grain and value grain. In contrast to the illustration in the exemplary embodiment, the oversize grain conveyor device 36 may also be swiveled outward from a machine frame 50 of the rock modification apparatus 12, so that the oversize grain fraction 34 is stockpiled instead of being returned.

The value grain that fell through the meshes of the upper post-screen deck 18*a* is fractionated further by the lower post-screen deck 18*b* into a fine grain fraction 38 having a smaller grain size and an medium grain fraction 40 having a greater grain size. Via a fine grain discharge conveyor device 42 in the form of a belt conveyor, the fine grain fraction 38 is heaped to build a fine grain stockpile 44. Via a medium grain discharge conveyor device 46, likewise in the form of a belt conveyor, the medium grain fraction 40 is heaped to build a medium grain stockpile (not shown in FIG. 1).

As a central structure, the rock modification apparatus 12 has a machine frame 50, on which the mentioned apparatus components are fastened or supported directly or indirectly. As the central power source, the rock modification apparatus 12 has a diesel combustion engine 52 supported on the machine frame 50, which generates the entire energy consumed by the rock modification apparatus 12, unless it is stored in energy stores such as batteries, for example. Additionally, the rock modification apparatus 12 may be connected to job site electrical current, if provided on the job site.

In the illustrated example, the rock modification apparatus 12, which may be part of a rock processing system having a plurality of rock modification apparatuses situated in a common flow of material, is a mobile, more precisely a self-propelled, rock modification apparatus 12 having a crawler travel gear 54, which via hydraulic motors 56 as drive of the rock modification apparatus 12 allows for a self-propelled change of location without an external towing vehicle.

The rock modification apparatus 12 comprises an apparatus-based part 62 of a control device 60 of the rock modification apparatus 12, for example in the form of an electronic data processing system having integrated circuits. The apparatus-based part 62 of the control device 60 makes it possible to control the operation of apparatus components. For this purpose, the control device 60 may control drives of apparatus components directly, for example, and/or may control actuators which in turn are able to move components.

The apparatus-based part 62 of the control device 60 comprises an apparatus data processing device 64, an apparatus data output device 66 connected in data-transmitting fashion to the apparatus data processing device 64 for the humanly perceptible output of data, and an apparatus transmitting and receiving device 68 connected in data-transmitting fashion to the apparatus data processing device 64 for the wireless transmission of data. An apparatus data memory 70, in which the operating program of the apparatus-based part 62 of the control device 60 as well as operating data are stored, is connected in data-transmitting fashion to the apparatus data processing device 64. During the operation of the rock modification apparatus 12, data may be stored in and retrieved from the apparatus data memory 70. An apparatus data input device 72 is connected in data-transmitting fashion to the apparatus data processing device 64 for inputting data. The apparatus data output device 66 preferably comprises a monitor. The apparatus data input device 72 preferably comprises pushbuttons and switches or control knobs.

The apparatus-based part 62 of the control device 60 is in the present case an on-board data processing system, including for example an operating console, that is physically firmly attached, indirectly or directly, to the machine frame 50. The apparatus-based part 62 of the control device 60 is permanently part of the control device 60.

As a temporary part of the control device 60, a remote control 82 may be connected wirelessly to the apparatus-based part 62 of the control device 60. For this purpose, the remote control 82 must be authenticated vis-a-vis the apparatus-based part 62 of the control device 60.

The remote control 82 comprises a remote data processing device 84 having a remote data output device 86, a remote transmitting and receiving device 88 connected in data-transmitting fashion to the remote data processing device 84, a remote data memory 90 connected in data-transmitting fashion to the remote data processing device 84, and a remote data input device 92 connected in data-transmitting fashion to the remote data processing device 84. The remote transmitting and receiving device 88 is designed to communicate signals directly with the apparatus transmitting and receiving device 68, that is, to receive signals from the apparatus transmitting and receiving device and to transmit signals to the latter. The equivalent applies also to the apparatus transmitting and receiving device 68.

The remote control 82 is designed to be physically separate from the rock modification apparatus 12 and from the apparatus-based part 62 of the control device 60. In the present preferred case, the remote control 82 is portable, for example in the form of a smart phone. Once established, a communication connection of the remote control 82 with the apparatus-based part 62 of the control device 60 is preferably the only connection with the rock modification apparatus 12. The communication connection is preferably wireless. Temporarily, it is also possible to connect the remote control to the apparatus-based part 62 of the control device 60 via a cable, for example a USB cable.

The remote control 82 also includes a camera as the remote data intake device 94.

In addition, a further remote control 82' may be connected to the apparatus-based part 62 of the control device 60 for wireless communication to be able to control at least one apparatus component of the rock modification apparatus 12 also via the further remote control 82'.

The further remote control 82' is constructed in the same manner as remote control 82. As was already the case in the introduction of the specification, its components are named in the same way as the components of remote control 82, although with the addition of the attribute "further" to indicate a distinction from the components of remote control 82. In distinguishing the further remote control components of the further remote control 82' from those of remote control 82, the further remote control component are provided with identical reference numerals as the remote control components of the remote control 82 but with an added apostrophe.

The method steps performed for authenticating the remote control 82 as a temporary part of the control device 60 are explained below with reference to FIG. 2.

In a step S10, the apparatus data processing device 64 is prompted to generate a first item of authentication information. In order to ensure a sufficient physical presence of an authorized operator at the rock modification apparatus 12 for the prompting of the generation of the first item of authentication information, the prompting of the generation of the first item of authentication information occurs by using a key 96 as an authentication secret on the side of the operator and a lock cylinder 98 as an authentication secret on the side of the apparatus. Only when the correct key 96 is inserted into the correct lock cylinder 98 can the cylinder core be rotated relative to the cylinder housing and thereby actuate a switch on the apparatus-based part 62 of the control device 60, which triggers the generation of the first item of authentication information A1 by the apparatus data processing device 64.

Subsequently, according to a step S12, a 12-digit character string is displayed on the apparatus data output device 66 as a generated first item of authentication information A1. The operator who prompted the generation of the first item of authentication information A1 on the apparatus-based part 62 of the control device 60 can read off the displayed character string from the apparatus data output device 66 and input it in accordance with a step S14 into the remote control 82 via the remote data input device 92.

The first item of authentication information A1 contains information about addressing the apparatus transmitting and receiving device 68 such as, for example, a device ID of the apparatus transmitting and receiving device 68 or a network ID of the wireless network used by the apparatus-based part 62 of the control device 60.

The first item of authentication information A1 contains furthermore a password or a character string, by which the remote control 82 is able to identify itself vis-a-vis the apparatus-based part 62 of the control device 60 as a trustworthy device. On the basis of its operating program stored in the remote data memory 90, the remote data processing device 84 is able to extract from the first item of authentication information A1 the information about the addressing of the apparatus transmitting and receiving device 68 and the password and to form the signals to be transmitted to the apparatus transmitting and receiving device 68 in such a way that upon receiving the signals the apparatus data processing device 64 is able to check these for conformity with the first item of authentication information A1 that is also stored in the apparatus data memory 70 of the apparatus data processing device 64.

The setup of a wireless communication between the remote control 82 and the apparatus-based part 62 of the control device 60 begins in accordance with a step S16. For this purpose, the remote control 82 wirelessly transmits signals by way of the remote transmitting and receiving device 88 to the apparatus-based part 62 of the control device 60, which receives the signals by way of the apparatus transmitting and receiving device 68. Through appropriate computation operations and/or through comparison with reference information stored in the apparatus data memory 70, the apparatus data processing device 64 checks whether the signals received from the remote control 82 correctly represent the first item of authentication information A1. If this is the case, the established wireless communication is maintained. According to a specific embodiment preferred from the perspective of security engineering, this maintenance is only for a predetermined duration, for example, for 1 to 3 minutes. Additionally, or alternatively, following the humanly perceptible output of the first item of authentication information A1 through the apparatus data output device 66, the first item of authentication information A1 may remain valid only for a predetermined maximum duration, for example for 1 to 5 minutes.

Following the setup of the wireless communication between the remote control 82 and the apparatus-based part 62 of the control device 60, an operator operating the remote control 82 may transmit a signal, preferably within the predetermined duration of the maintenance of the wireless communication, by operating the remote data input device 92 in accordance with a step S18, from the remote control 82 to the apparatus-based part 62 of the control device 60, which signal prompts the apparatus-based data processing device 64, following the reception of the signal in accordance with a step S20, to generate a second item of authentication information A2. Alternatively, the generation of the second item of authentication information A2 may occur automatically following the setup of the wireless communication.

The second item of authentication information A2 contains a greater number of characters than the first item of authentication information A1. The characters in the second item of authentication information A2 are selected from a more extensive character set than the characters of the first item of authentication information A1. While, for example, the first item of authentication information A1 contains 12 characters, each of which being one of the numerals 0 to 9, the second item of authentication information A2 may comprise 32 characters, each of which being selected from a character set that contains the numerals 0 to 9, the lowercase letters a to z, and the uppercase letters A to Z. A conventional ANSI set of letters contains 26 letters from A to Z so that the character set for forming the second item of authentication information A2 provides at each of its 32 digits a selection of 62 possible different characters. Because of the $62^{32}$ possibilities of forming the second item of authentication information A2, the security level of the second item of authentication information A2 is significantly higher than the security level of the first item of authentication information A1, for the formation of which only 10,000,000,000 possibilities are available. On the other hand, the first item of authentication information A1 can be transferred into the remote control with a lower risk of error by an operator perceiving it, for example reading it.

Following the generation of the second item of authentication information A2 in the step S20, the apparatus-based part 62 of the control device 60 transmits the second item of authentication information A2 through the apparatus transmitting and receiving device 68 to the remote control 82 in accordance with a step S22. Consequently, the apparatus-based part 62 of the control device 60 and the remote control 82 are now in possession of the same second item of authentication information on a higher security level. The remote control 82 can thus be part of the control device 60 of the rock modification apparatus 12. The remote control 82 may be part of the control device 60 until it is switched off, logged out, its power supply is depleted, or until once more the generation of a first item of authentication information A1 is prompted.

In a step S24, the remote control 82 is now able to establish a wireless communication with the apparatus-based part 62 of the control device 60 on the basis of the second item of authentication information A2. The second item of authentication information A2 may again contain an identifier such as a device ID or network ID, for example. For example, with the transmission of the second item of authentication information A2 to the remote control 82, if applicable after reception of a receipt confirmation from the remote control 82, the apparatus data processing device 64 may switch the network ID from a network ID encoded in the first item of authentication information A1 to another network ID encoded in the second item of authentication information A2. A new password or the like is preferably also encoded in the second item of authentication information A2. The remote control 82 again is able to decode both on the basis of its operating program contained in the remote data memory 90 and accordingly form its signals that are to be transmitted to the apparatus-based part 62 of the control device 60 on the basis of the second item of authentication information A2.

With the transmission of the second item of authentication information A2 to the remote control 82 or following the receipt of the confirmation of a successful reception of the second item of authentication information A2 by the remote control 82 or through the attempt of the remote control 82 to establish a wireless communication with the apparatus-based part 62 of the control device 60 on the basis of the second item of authentication information A2, the apparatus data processing device 64 is able to deactivate the first item of authentication information A1. In the illustrated exemplary embodiment, the step of establishing a wireless communication between the apparatus-based part 62 of the control device 60 and the remote control 82 is to occur in the step S24, and the deactivation of the first item of authentication information A1 is to occur in a step S26. The order may also be reversed.

Following the establishment of a wireless communication between the apparatus-based part 62 of the control device 60 and the remote control 82, some or all of the apparatus components of the rock modification apparatus 12 may be controlled by the remote control 82. Operating states of apparatus components and sensor values of operating sensors on the rock modification apparatus 12 may also be displayed or output on the remote control 82.

Controlling apparatus components of the rock modification apparatus 12 and outputting operating states of its apparatus components is preferably possible only after a wireless communication has been established on the basis of the second item of authentication information A2, but not with the wireless communication set up on the basis of authentication information A1.

Figure 2:
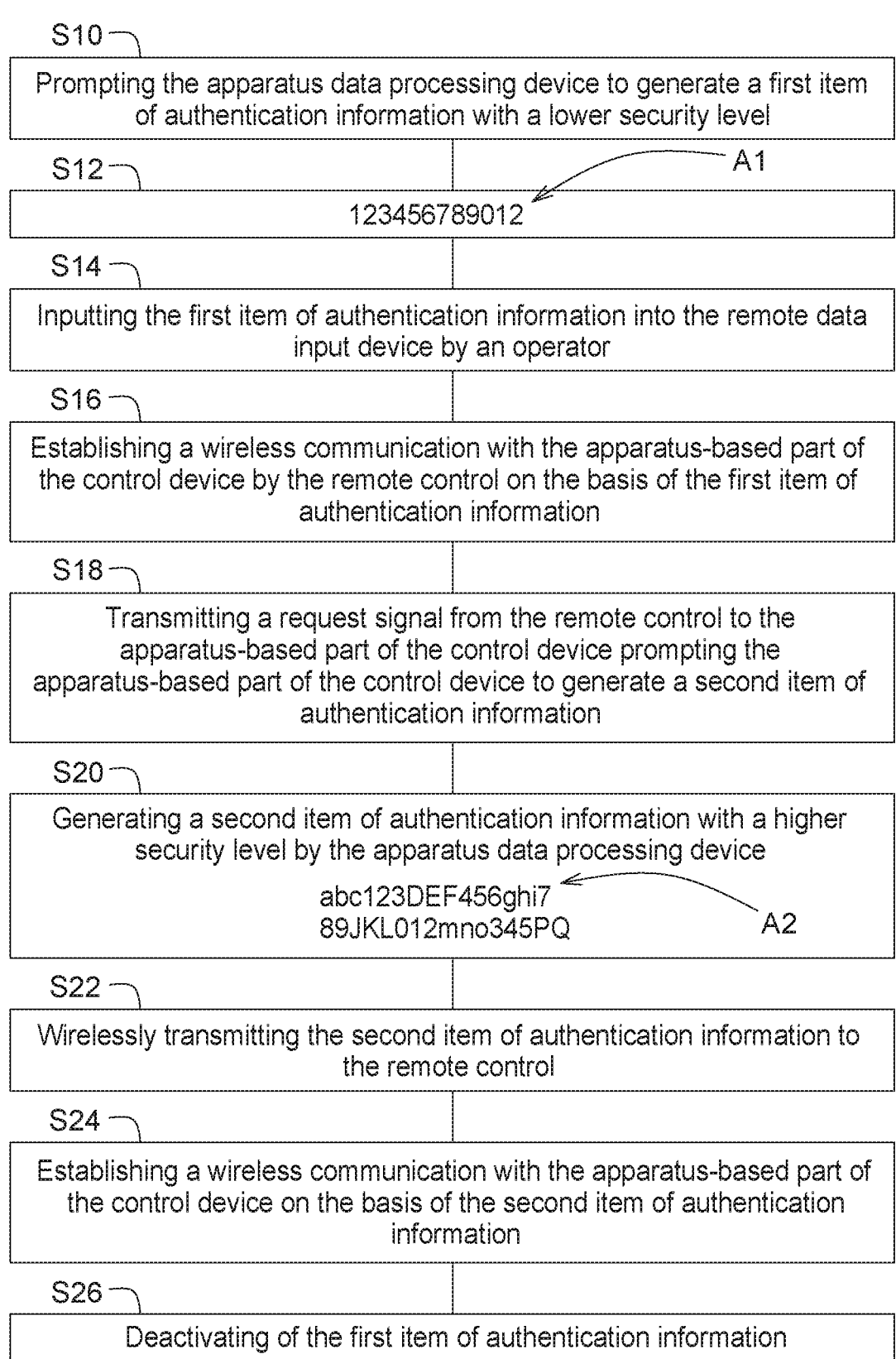
FIG. 2 illustrates a schematic block diagram of an authentication method.

If, in addition to the remote control 82, the further remote control 82' is also to be authenticated as a temporary part of the control device 60, this cannot occur according to the method shown in FIG. 2, for a renewed execution of the step S10 would immediately result in the severance of the wireless communication between the apparatus-based part 62 of the control device 60 and the remote control 82.

Figure 3:
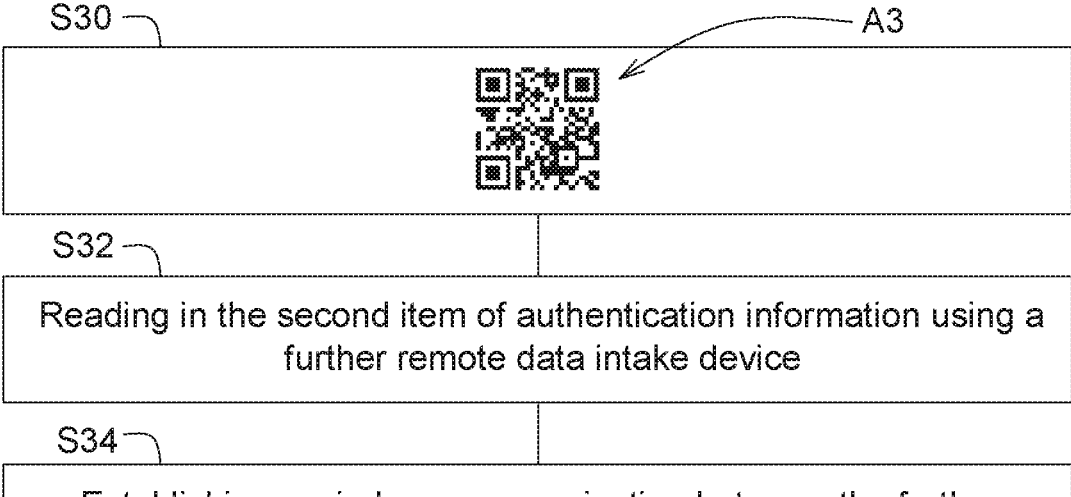
FIG. 3 illustrates a flowchart of a further aspect of the authentication method for authenticating a further remote control for the rock modification apparatus of the machine set of FIG. 1.

The integration of the further remote control 82' into the control device 60 of the rock modification apparatus 12 therefore occurs in accordance with the further method steps illustrated symbolically in FIG. 3.

Via its remote data output device 86, the first remote control 82 outputs the second item of authentication information A2 in accordance with a step S30, namely, visually in encoded form, for example as a QR code. The visual output has the advantage of a very short range of the information output, so that the latter cannot be tapped in unwanted fashion from a distance. The encoded form has the advantage that it can be read in directly by the further remote control 82' and does not have to be entered character by character by an operator. The latter may be provided as a contingency measure in the event that the automatic reading does not work, for example due to a defect of the remote data output device 86 or due to severe soiling or damage of camera 94' as the further remote data intake device. The visual output in machine-readable encoded form is standardly preferred.

The machine-readable encoded information A3 output on the remote data output device 86 of the remote control 82 contains the second item of authentication information A2. It may contain merely the second item of authentication information A2, but is not necessarily limited to it. In addition to the second item of authentication information A2, the machine-readable encoded information A3 may contain further information, for example information about the configuration of the rock modification apparatus 12 and/or the remote control 82.

In a step S32, the information A3 represented on the remote data output device 86 is read in by the further remote data intake device 94' of the further remote control 82' and is transmitted to its further remote data processing device 84'. The further remote data processing device 84' decodes the read-in information A3 and establishes, in accordance with a step S34, its own wireless communication with the apparatus-based part 62 of the control device 60 on the basis of the decoded information A3 including the second item of authentication information A2, as a result of which the further remote control 82' is also authenticated as a temporary part of the control device 60.

Figure 4:
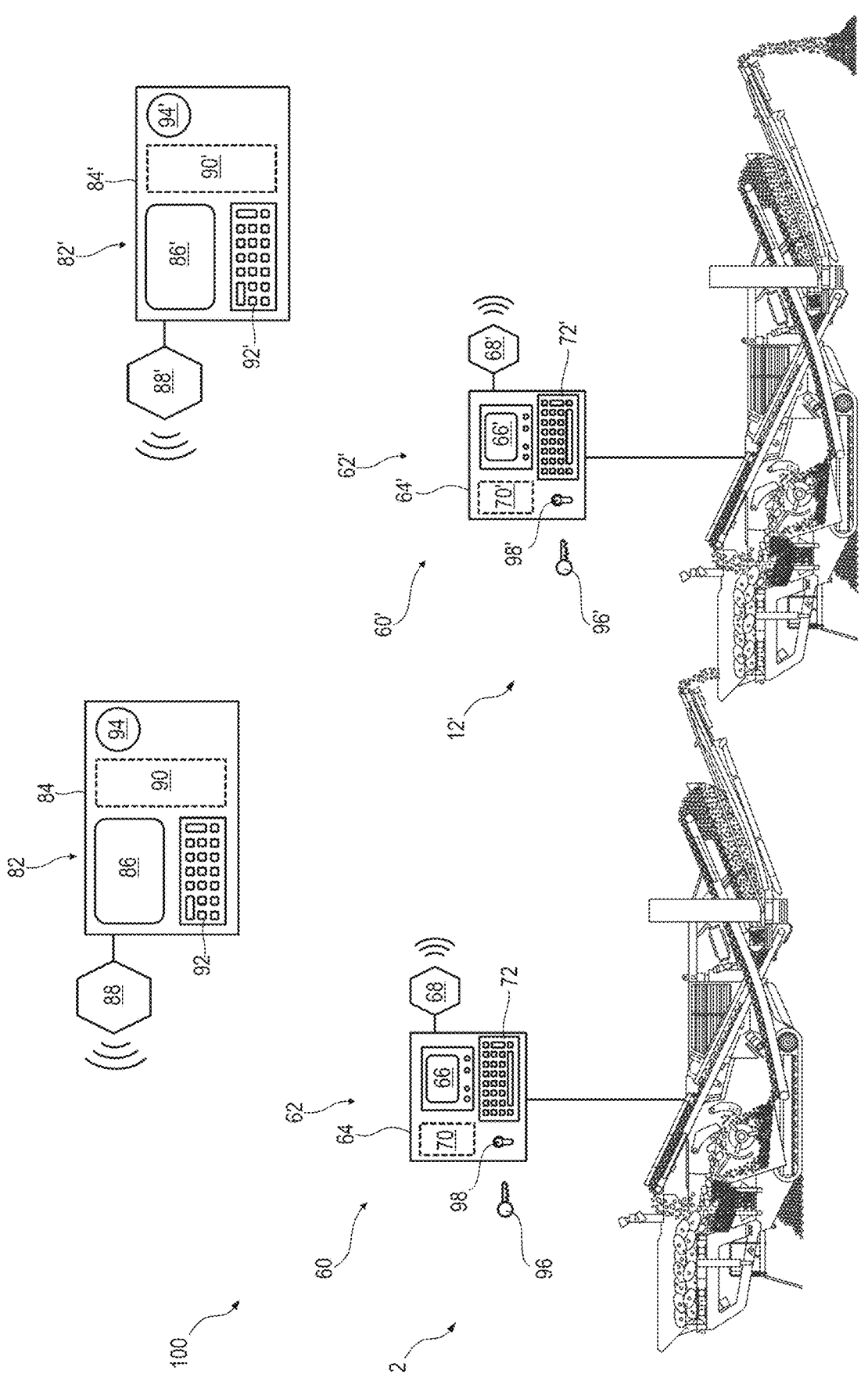
FIG. 4 illustrates a schematic representation of the machine set of FIG. 1 expanded by an additional rock modification apparatus.

FIG. 4 illustrates a case of rock modification apparatuses 12 and 12' operating in concatenated fashion. To facilitate the explanation, it is assumed that the further rock modification apparatus 12' and in particular the apparatus-based part 62' of its control device 60' is substantially identical in construction as the rock modification apparatus 12 and its apparatus-based part 62 of the control device 60.

It shall be assumed in the following that the further rock modification apparatus 12' is also not designed for an encoded output, for example in the form of a QR code, of a sufficiently secure item of authentication information. Otherwise, a permanent authentication of a remote control 82 and/or 82' on the further rock modification apparatus 12' could be accomplished very simply via an output of an encoded item of authentication information on the further rock modification apparatus 12' and its being read in by at least one of the remote controls 82 and/or 82'.

If one of the two remote controls 82 or 82', for which a wireless communication with the rock modification apparatus 12 is already established or may be established by performing the method steps explained above, is also to be authenticated vis-a-vis the further rock modification apparatus 12', then the method from FIG. 2 is carried out anew with the involvement of the further rock modification apparatus 12'. The prompting of a generation of a first item of authentication information in the further apparatus data processing device 64' does not necessarily result in a severance of an already established wireless communication between the respective remote control 82 or 82' and the rock modification apparatus 12, if such exists during the further authentication of the respective remote control 82 or 82' on the further rock modification apparatus 12', since the control devices 60 and 60' of the rock modification apparatus 12 or of the further rock modification apparatus 12' initially do not communicate with each other.

Provided that the relevant further component of the further apparatus-based part 62' of the further control device 60' of the further rock modification apparatus 12' performs the steps that were explained above in connection with FIG. 2 for a component of the apparatus-based part 62 of the control device 60 of the rock modification apparatus 12, the remote control 82 and/or the further remote control 82' can be authenticated vis-a-vis the further rock modification apparatus 12' and a wireless communication of the remote control 82 and/or of the further remote control 82' can also be established with the further rock modification apparatus 12', so that the remote control 82 and/or the further remote control 82' is in the end also able to control one apparatus component, multiple apparatus components, or all apparatus components of the further rock modification apparatus 12' and represent their operating states.

After at least one remote control 82 and/or 82' has been authenticated vis-a-vis both rock modification apparatuses 12 and 12' and a wireless communication has been established between the rock modification apparatuses 12 and 12' and the at least one remote control of remote control 82 and 82', the two rock modification apparatuses 12 and 12' may be combined to form one plant train 100 in terms of control engineering by suitable control commands, whether of an apparatus-based part 62 or 62' of a control device 60 or 60' or of a remote control 82 or 82'.

In this case, prompting the generation of a first item of authentication information on only one of the two apparatus data processing devices 64 or 64' terminates the wireless communication of every rock modification apparatus of the plant train 100 with every authenticated remote control.

The plant train 100 may of course comprise more than two rock modification apparatuses 12 and 12'. Likewise, more than two remote controls 82 and 82' may be authenticated for wireless communication with a rock modification apparatus 12.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method for the authentication of a wireless remote control as a temporary part of a control device of a rock modification apparatus, wherein the rock modification apparatus comprises as an apparatus-based part of the control device, an apparatus data processing device connected to the rock modification apparatus, an apparatus data output device connected in data-transmitting fashion to the apparatus data processing device for a humanly perceptible output of data, and an apparatus transmitting and receiving device connected in data-transmitting fashion to the apparatus data processing device for the wireless transmission of data, wherein the wireless remote control comprises a remote data processing device (84), a remote data input device connected in data-transmitting fashion to the remote data processing device for the input of data by an operator, and a remote transmitting and receiving device connected in data-transmitting fashion to the remote data processing device for the wireless transmission of data, wherein the method comprises:

prompting the apparatus data processing device to generate a first item of authentication information with a lower security level;

outputting a humanly perceptible output of the first item of authentication information on the apparatus data output device;

inputting the first item of authentication information into the remote data input device by an operator;

establishing a wireless communication with the apparatus-based part of the control device by the remote control on the basis of the first item of authentication information;

after establishing the wireless communication, generating a second item of authentication information with a higher security level by the apparatus data processing device; and wirelessly transmitting the second item of authentication information to the remote control.

2. The method as defined in claim 1, wherein after wirelessly transmitting the second item of authentication information to the remote control, the method further comprises:

establishing a wireless communication between the remote control and the apparatus-based part of the control device on the basis of the second item of authentication information; and deactivating the first item of authentication information.

3. The method as recited in claim 2, wherein the step of prompting of a generation of the first item of authentication information comprises checking a compatibility of an authentication secret on the side of the operator with an authentication secret on the side of the apparatus.

4. The method as defined in claim 2, wherein between the step of establishing the wireless communication with the apparatus-based part of the control device by the remote control on the basis of the first item of authentication information and the step of generating the second item of authentication information with the higher security level, the method comprises a step of transmitting a request signal from the remote control to the apparatus-based part of the control device, wherein generating the second item of authentication information with a higher security level is carried out by the apparatus data processing device only upon receipt of the request signal at the apparatus data processing device.

5. The method as defined in claim 2, wherein the remote control comprises a remote data output device connected in data-transmitting fashion to the remote data processing device for the output of data, and wherein the method further comprises:

outputting the second item of authentication information using the remote data output device of the remote control;

reading in the second item of authentication information using a further remote data intake device of a further wireless remote control, wherein the further wireless remote control comprises a further remote data processing device, the further remote data intake device connected in data-transmitting fashion to the further remote data processing device for taking in data, and a further remote transmitting and receiving device connected in data-transmitting fashion to the further remote data processing device for the wireless transmission of data; and establishing a wireless communication between the further remote control and the apparatus-based part of the control device on the basis of the second item of authentication information.

6. The method as defined in claim 5, wherein the remote data output device of the remote control outputs the second item of authentication information only into a limited spatial area, so that the second item of authentication information can only be read in by the further remote data intake device when the further remote data intake device is located in the limited spatial area.

7. The method as defined in claim 1, wherein the step of prompting of a generation of the first item of authentication information comprises checking a compatibility of an authentication secret on the side of the operator with an authentication secret on the side of the apparatus.

8. The method as defined in claim 1, wherein between the step of establishing the wireless communication with the apparatus-based part of the control device by the remote control on the basis of the first item of authentication information and the step of generating the second item of authentication information with the higher security level, the method comprises a step of transmitting a request signal from the remote control to the apparatus-based part of the control device, wherein generating the second item of authentication information with a higher security level is carried out by the apparatus data processing device only upon receipt of the request signal at the apparatus data processing device.

9. The method as defined in claim 1, wherein the remote control comprises a remote data output device connected in data-transmitting fashion to the remote data processing device for the output of data, and wherein the method further comprises:

outputting the second item of authentication information using the remote data output device of the remote control;

reading in the second item of authentication information using a further remote data intake device of a further wireless remote control, wherein the further wireless remote control comprises a further remote data processing device, the further remote data intake device connected in data-transmitting fashion to the further remote data processing device for taking in data, and a further remote transmitting and receiving device connected in data-transmitting fashion to the further remote data processing device for the wireless transmission of data; and establishing a wireless communication between the further remote control and the apparatus-based part of the control device on the basis of the second item of authentication information.

10. The method as defined in claim 9, wherein the remote data output device of the remote control outputs the second item of authentication information only into a limited spatial area, so that the second item of authentication information can only be read in by the further remote data intake device when the further remote data intake device is located in the limited spatial area.

11. The method as defined in claim 1, wherein:

the steps of prompting the apparatus data processing device to generate the first item of authentication information with a lower security level, outputting the humanly perceptible output of the first item of authentication information on the apparatus data output device, inputting the first item of authentication information into the remote data input device by the operator, establishing a wireless communication with the apparatus-based part of the control device by the remote control on the basis of the first item of authentication information, generating the second item of authentication information with a higher security level by the apparatus data processing device, and wirelessly transmitting the second item of authentication information to the remote control are carried out for the authentication of the remote control authenticated on the rock modification apparatus on the basis of the first item of authentication information as a temporary part of a further control device of a further rock modification apparatus;

the further rock modification apparatus comprises as an apparatus-based part of its further control device a further apparatus data processing device connected to the further rock modification apparatus, a further apparatus data output device connected in data-transmitting fashion to the further apparatus data processing device for the humanly perceptible output of data, and a further apparatus transmitting and receiving device connected in data-transmitting fashion to the further apparatus data processing device for the wireless transmission of data; and a setup of the apparatus-based part of the control device in the steps of prompting the apparatus data processing device to generate the first item of authentication information with a lower security level, outputting the humanly perceptible output of the first item of authentication information on the apparatus data output device, inputting the first item of authentication information into the remote data input device by the operator, establishing a wireless communication with the apparatus-based part of the control device by the remote control on the basis of the first item of authentication information, generating the second item of authentication information with a higher security level by the apparatus data processing device, and wirelessly transmitting the second item of authentication information to the remote control is replaced with the corresponding further setup of the apparatus-based part of the further control device.

12. The method as defined in claim 11, wherein the remote control and the apparatus-based part of the further control device carry out the step of establishing a wireless communication between the remote control and the apparatus-based part of the control device on the basis of the second item of authentication information and the step of deactivating the first item of authentication information with the provision that the apparatus-based part of the control device is replaced with the apparatus-based part of the further control device.

13. The method as defined in claim 12, wherein the method further comprises forming a plant train comprising the rock modification apparatus and the further rock modification apparatus, wherein the rock modification apparatus and the further rock modification apparatus communicate wirelessly with the remote control on the basis of the respective second item of authentication information.

14. The method as defined in claim 1 further comprising the step of severing an existing wireless communication between the remote control and the rock modification apparatus in response to the occurrence of a predetermined dissolution event.

15. The method as defined in claim 14, wherein the predetermined dissolution event comprises the prompting of a generation of a first item of authentication information.

16. A machine set comprising a rock modification apparatus and a wireless remote control, wherein:

the rock modification apparatus comprises apparatus components, the apparatus components comprising:

a material feed device for loading rock material to be processed;

at least one conveyor device for conveying material between two different locations; and a control device for controlling the operation of at least one apparatus component of the rock modification apparatus (12), wherein the control device is an apparatus-based part, which comprises:

an apparatus data processing device connected to the rock modification apparatus;

an apparatus data output device connected in data-transmitting fashion to the apparatus data processing device for the humanly perceptible output of data; and an apparatus transmitting and receiving device connected in data-transmitting fashion to the apparatus data processing device for the wireless transmission of data;

the wireless remote control comprises:

a remote data processing device;

a remote data input device connected in data-transmitting fashion to the remote data processing device for the input of data by an operator; and a remote transmitting and receiving device connected in data-transmitting fashion to the remote data processing device for the wireless transmission of data;

and the rock modification apparatus and the wireless remote control are designed for the authentication of the remote control as a temporary part of the control device for carrying out the method according to one of the preceding claims.

17. The machine set as defined in claim 16, wherein:

the machine set comprises a further rock modification apparatus, wherein the further rock modification apparatus comprises as apparatus components a further material feed device for loading rock material to be processed, at least one further conveyor device for conveying material between two different locations, and a further control device for controlling the operation of at least one apparatus component of the further rock modification apparatus;

the further control device comprises as an apparatus-based part a further apparatus data processing device connected to the further rock modification apparatus, a further apparatus data output device connected in data-transmitting fashion to the further apparatus data processing device for the humanly perceptible output of data, and a further apparatus transmitting and receiving device connected in data-transmitting fashion to the further apparatus data processing device for the wireless transmission of data;

for the purpose of authenticating the remote control, which is already authenticated on the rock modification apparatus on the basis of at least the first item of authentication information, as a temporary part of the further control device, the wireless remote control and the further rock modification apparatus are designed to perform the following steps:

prompting the apparatus data processing device to generate a first item of authentication information with a lower security level;

outputting a humanly perceptible output of the first item of authentication information on the apparatus data output device;

inputting the first item of authentication information into the remote data input device by an operator;

establishing a wireless communication with the apparatus-based part of the control device by the remote control on the basis of the first item of authentication information;

after establishing the wireless communication, generating a second item of authentication information with a higher security level by the apparatus data processing device; and wirelessly transmitting the second item of authentication information to the remote control;

and the foregoing steps are performed with the provision that a setup of the apparatus-based part of the control device in the foregoing steps is replaced with the corresponding further setup of the apparatus-based part of the further control device of the further rock modification apparatus.

18. The machine set as defined in claim 17, wherein the rock modification apparatus and the further rock modification apparatus form a plant train.

19. The machine set as defined in claim 16, wherein:

the remote control comprises a remote data output device connected in data-transmitting fashion to the remote data processing device for outputting data;

the machine set comprises a further wireless remote control, wherein the further wireless remote control comprises:

a further remote data processing device;

a remote data intake device connected in data-transmitting fashion to the further data processing device for taking in data; and a further remote transmitting and receiving device connected in data-transmitting fashion to the further remote data processing device for the wireless transmission of data;

and the rock modification apparatus, the remote control and the further remote control:

output the second item of authentication information using the remote data output device of the remote control;

read in the second item of authentication information using a further remote data intake device of a further wireless remote control, wherein the further wireless remote control comprises a further remote data pro-
cessing device, the further remote data intake device
connected in data-transmitting fashion to the further
remote data processing device for taking in data, and
a further remote transmitting and receiving device 5
connected in data-transmitting fashion to the further
remote data processing device for the wireless trans-
mission of data; and
establish a wireless communication between the further
remote control and the apparatus-based part of the 10
control device on the basis of the second item of
authentication information.

* * * * *